United States Patent
Kearns

(10) Patent No.: US 9,418,363 B2
(45) Date of Patent: Aug. 16, 2016

(54) POINT OF SALE ACTIVATION CARD UNIT

(71) Applicant: Matthew Robert Kearns, Woodstock, GA (US)

(72) Inventor: Matthew Robert Kearns, Woodstock, GA (US)

(73) Assignee: Printed Specialties Inc., Carrollton, GA (US)

( * ) Notice: Subject to any disclaimer, the term of this patent is extended or adjusted under 35 U.S.C. 154(b) by 276 days.

(21) Appl. No.: 14/219,735

(22) Filed: Mar. 19, 2014

(65) Prior Publication Data

US 2015/0269564 A1    Sep. 24, 2015

(51) Int. Cl.
*G06K 15/00* (2006.01)
*G06Q 20/34* (2012.01)
*G06Q 20/20* (2012.01)

(52) U.S. Cl.
CPC ............ *G06Q 20/354* (2013.01); *G06Q 20/204* (2013.01)

(58) Field of Classification Search
USPC .......................................... 235/383, 381, 487
See application file for complete search history.

(56) References Cited

U.S. PATENT DOCUMENTS

| | | | |
|---|---|---|---|
| 2010/0235249 A1* | 9/2010 | Smith | .................. G06Q 20/202 705/18 |
| 2012/0138676 A1* | 6/2012 | Ma | .......................... B65H 7/12 235/379 |
| 2012/0278189 A1 | 11/2012 | Goldberg et al. | |
| 2013/0319895 A1 | 12/2013 | Hanks | |
| 2015/0032560 A1* | 1/2015 | Biswas | ................ G06Q 20/342 705/22 |

\* cited by examiner

*Primary Examiner* — Ahshik Kim
(74) *Attorney, Agent, or Firm* — Bryan W. Bockhop; Bockhop Intellectual Property Law, LLC

(57) ABSTRACT

A point of sale activation unit that includes a first wallet portion, a second wallet portion and an activation card portion. The first wallet portion defines a first opening that has a shape corresponding to a machine readable code and includes a security tab affixed thereto with two nicks. The security tab obscures a second opening. The second wallet portion is coupled to the first wallet portion. The activation card portion is narrower than the second opening. The machine readable code is printed on an exterior side and an activation code is printed on an interior side of the activation card portion, which extends from the second wallet portion. The first wallet portion, the second wallet portion and the activation card portion are all cut from a single flat sheet and are folded and glued together so that the machine readable code is exposed through the first opening.

8 Claims, 4 Drawing Sheets

POINT OF SALE ACTIVATION CARD UNIT

BACKGROUND OF THE INVENTION

1. Field of the Invention

The present invention relates to point of sale activation cards and, more specifically, to a point of sale activation card unit cut from a single sheet.

2. Description of the Related Art

Point of sale activation (POSA) cards are devices used to convey value to a user. Typically, they are used as gift cards and cards used to activate online services, such as services associated with video games. POSA cards are frequently available on display racks of retail stores. They have no actual value until they are activated electronically by the cashier at the point of sale upon payment for the card by the customer. Activation is typically accomplished by reading a bar code on the POSA card at the point of sale.

With POSA cards for online services, the customer removes an activated card from a paperboard backing, which exposes a scratch off area. The customer removes the temporary medium on the scratch off area to reveal a unique activation code. The customer enters the activation code into an electronic device, which then makes a desired online service available to the customer.

Existing POSA cards can be difficult to produce because they typically require several printing steps. First the basic graphics are printed on both sides of the card. Next the bar code and the corresponding activation code must be printed on the card and then the scratch off medium is applied to the card. Graphics are also printed on the paperboard backing and the card is then glued to the paperboard backing. This process can be complicated and time consuming.

Therefore, there is a need for a POSA card that is easier to make than existing POSA cards.

SUMMARY OF THE INVENTION

The disadvantages of the prior art are overcome by the present invention which, in one aspect, is a point of sale activation unit that includes a first wallet portion, a second wallet portion and an activation card portion. The first wallet portion has an exterior side and an opposite interior side. The first wallet portion defines a first opening therethrough that has a shape corresponding to a machine readable code. The first wallet portion includes a security tab affixed thereto with at least two nicks. The security tab obscures at least part of a second opening defined by the first wallet portion. A second wallet portion has an exterior side and an opposite interior side. The second wallet portion is coupled to the first wallet portion. The activation card portion has an exterior side, an opposite interior side and a width that is less than the second opening defined by the first wallet portion. The machine readable code is printed on the exterior side and an activation code is printed on the interior side. The activation card portion extends from the second wallet portion and is coupled thereto with at least one nick. The first wallet portion, the second wallet portion and the activation card portion are all cut from a single flat sheet. The activation card portion is folded against the interior side of the second wallet portion. The interior side of the first wallet portion is folded against the interior side of the second wallet portion so as to define a space therebetween and so that the activation card portion is disposed in the space. The first opening is positioned so that the machine readable code is exposed through the first opening. The first wallet portion is glued to the second wallet portion so as to prevent access to the activation code. The security tab is configured to be opened by tearing at least one nick thereby allowing the activation card portion to be removed through the second opening so as to expose the activation code.

In another aspect, the invention is a method of making a point of sale activation unit, in which an exterior graphic is printed on a first side of a flat sheet. The graphic includes machine readable code. The flat sheet is cut so as to have three adjacent portions, including a first wallet portion, a second wallet portion and an activation card portion. The first wallet portion defines a first opening therethrough. The first opening has a shape corresponding to the machine readable code. The first wallet portion also defines a second opening having a width. A security tab is defined by the first wallet portion and is held in place by at least two nicks so as cover a portion of the second opening. The second wallet portion extends from the first wallet portion. The activation card portion extends from a selected one of the first wallet portion and the second wallet portion and is coupled thereto with at least one nick. The activation card portion has a width less than second opening. The machine readable code is disposed on the activation card portion. An activation code is printed on a second side of the flat sheet in an area of the activation card portion. The activation card portion is folded against the second wallet portion. The first wallet portion is folded against the second wallet portion so that the activation card portion is disposed therebetween and so that the machine readable code is exposed through the first opening defined by the first wallet portion. A peripheral portion of the first wallet portion is coupled to the second wallet portion so as to prevent access to the activation code.

In yet another aspect, the invention is a method of using a point of sale activation unit in which the point of sale activation unit, having an exterior machine readable code printed thereon, is presented to a cashier for purchase and activation of the point of sale activation unit. A security tab is opened on a wallet portion of the point of sale activation unit, thereby exposing a first opening in the wallet portion and exposing a part of an activation card portion that is disposed inside of the wallet portion. An activation code is printed on an interior side of the activation card portion. The activation code is hidden from view by the wallet portion. The activation card portion is removed from the wallet portion. The activation code is entered into an electronic device.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
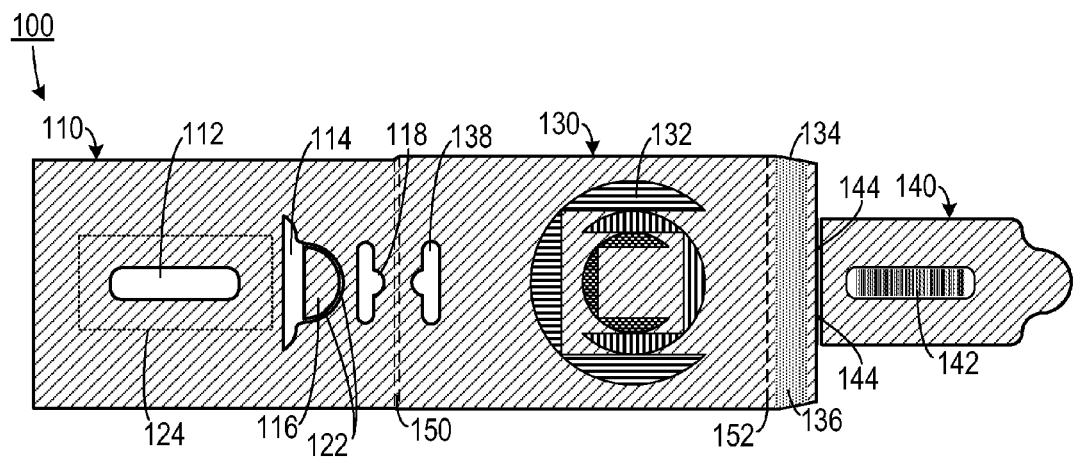
FIG. 1 is a plan view of one embodiment of a point of sale activation card unit prior to folding.
Figure 2A:
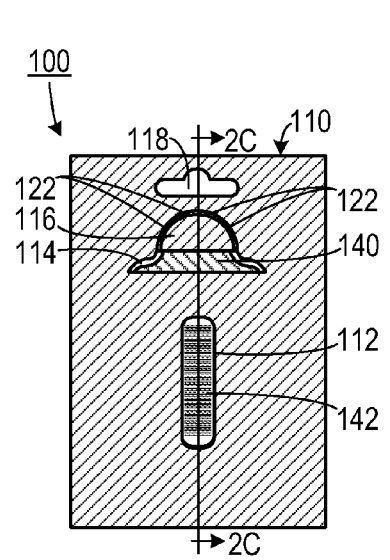
FIG. 2A is a plan view of a first side of the embodiment shown in FIG. 1 after folding.
Figure 2B:
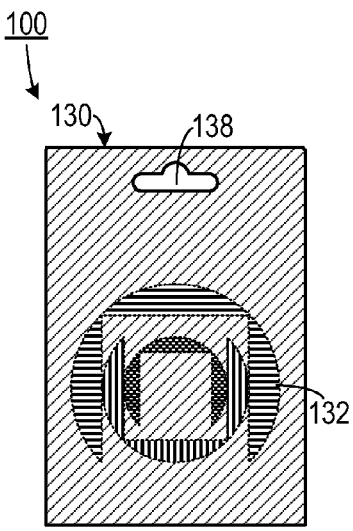
FIG. 2B is a plan view of a second side of the embodiment shown in FIG. 1 after folding.
Figure 2C:
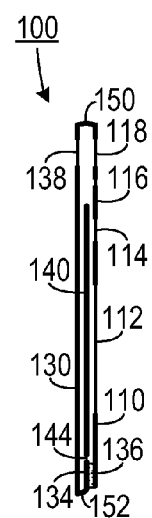
FIG. 2C is a cross sectional view of the embodiment shown in FIG. 2A, taken along line 2C-2C.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." As used here the word "nick" and "nicks" refer to the small portions of a sheet that remain in a cut rule that hold a first portion of the sheet to a second portion of the sheet after the sheet has been subject to a notched cut.

As shown in FIGS. 1, 2A-2C and 3A-3D, one embodiment of a point of sale activation (POSA) unit 100 includes a first wallet portion 110, as second wallet portion 130 and an activation card portion 140 that are all coupled to each other and that are cut from a single sheet of material, such as paperboard or plastic. The second wallet portion 130 is contiguous with the first wallet portion 110 and the activation card portion 140 is connected to a glue tab 134 extending from the second wallet portion 130 by one or more nicks 144 formed as a result of a notched cut. A machine readable code 142 (such as a barcode) is printed on the exterior side of the activation card portion 140 and other graphics, which can include a logo 132, for example, can be printed on the exterior sides of the first wallet portion 110 and the second wallet portion 130. An activation code 144 is printed on the interior side of the activation card portion 140.

A first opening 112 corresponding in size to the machine readable code 142 is cut in the first wallet portion 110. An optional clear plastic window material 124 can be glued onto the first wallet portion 110 so as to cover the first opening 112. A second opening 114, which is wider than the width of the activation card portion 140, is cut into the first wallet portion 110. A security tab 116 is also cut into the first wallet portion 110 and is held thereto with at least two nicks 122. A first hang tab opening 118 can be cut into the first wallet portion 110 and a second hang tab opening can be cut into the second wallet portion 130. The first hang tab opening 118 can have dimensions that make it slightly smaller than the second hang tab opening 138, thereby obscuring from view the edges of the second hang tab opening 138.

Fold lines 150 and 152 can be scored into the sheet so that the activation card portion 140 can be folded against the second wallet portion 130 and the first wallet portion. Glue 136 is then applied to the glue tab 134 and to other spots on the periphery of either the first wallet portion 110 or the second wallet portion 130. The first wallet portion 110 is then folded against the second wallet portion 130 with the activation card portion 140 disposed in the space defined therebetween. Once folded, the machine readable code 142 is viewable through the first opening 112. However, the activation code 144 is obscured by the second wallet portion 130. Once the wallet portions 110 and 130 are glued into place, a tampering with the POSA card 100 that results in access to the activation code 144 becomes evident as a result of fiber tear of wallet portion fibers that have fused with the glue. Other methods of making such tampering evident may also be employed.

Figure 3A:
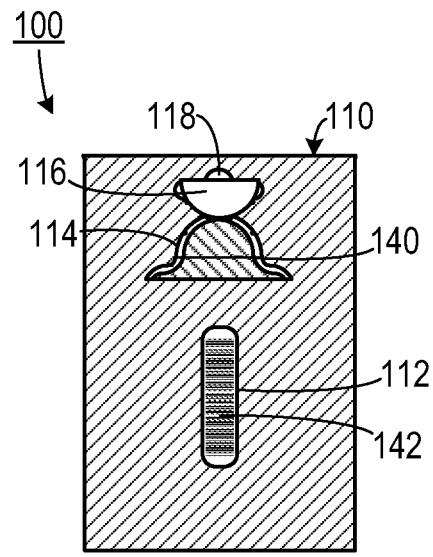
FIGS. 3A-3D are a series of plan views demonstrating use of the embodiment shown in FIG. 1.
Figure 3B:
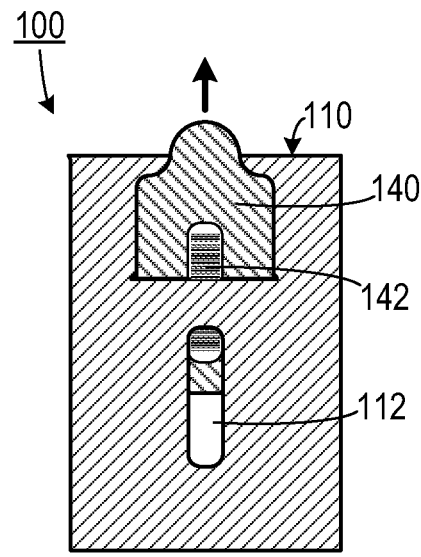
Figure 3C:
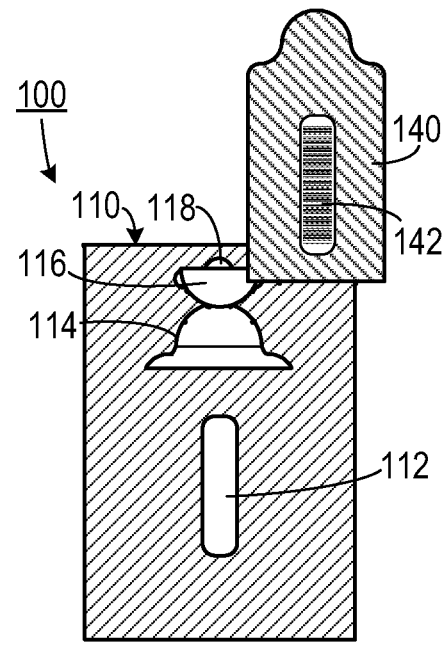
Figure 3D:
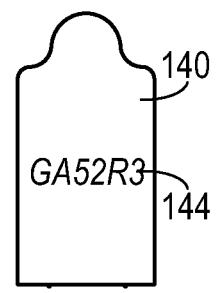

In use, the POSA unit 100 is activated when a cashier scans the machine readable code 142 as a result of the end user purchasing it. As shown in FIGS. 3A-3D, the end user tears the security tab 116 back, which allows removal of the activation card portion 140 through the second opening 114. Once removed, the end user is then able to access the activation code 144 on the side of the activation card portion 140 opposite of the side on which the machine readable code 142 is printed, as shown in FIG. 3D. The end user then enters the activation code 144 into a corresponding electronic device or application, thereby conferring on the end user the functionality that the POSA card 100 represents.

Figure 4:
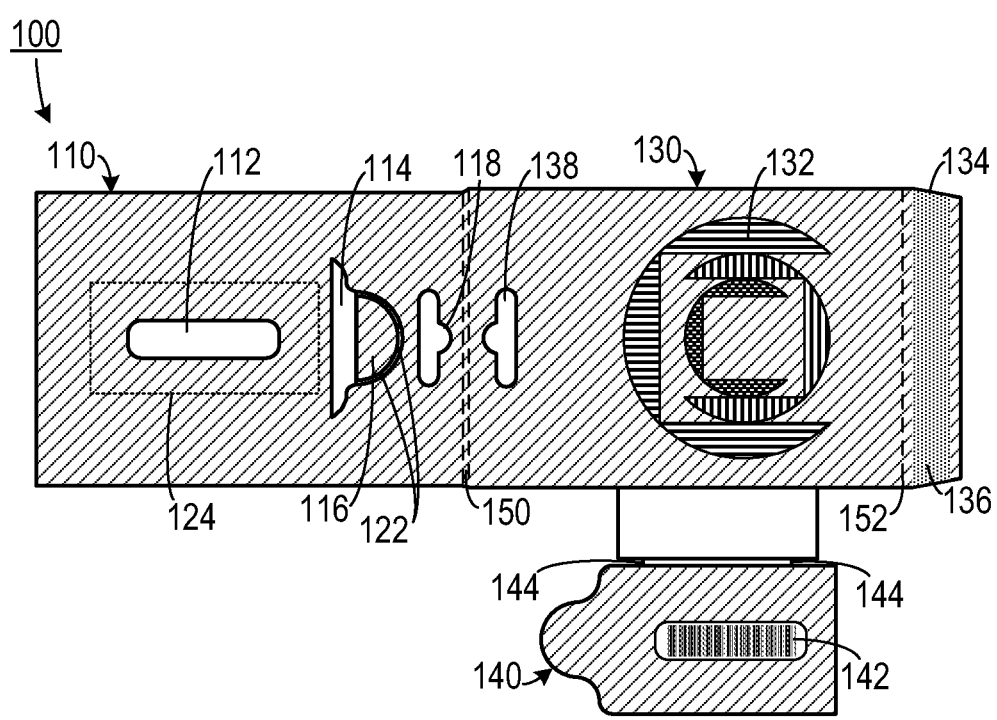
FIG. 4 is a plan view of a second embodiment of a point of sale activation card unit prior to folding.

An embodiment in which the activation card portion 140 is disposed to one side of the second wallet portion 130 is shown in FIG. 4.

Figure 5:
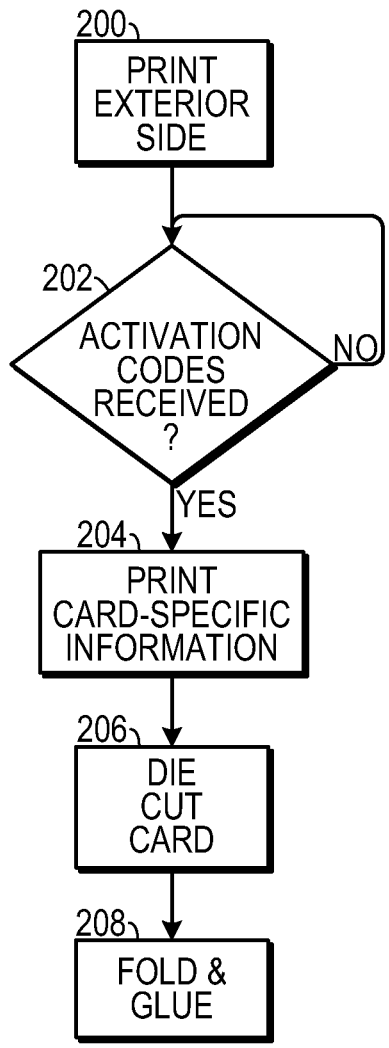
FIG. 5 is a flowchart demonstrating one method of making a point of sale activation card unit.

One method of making such a POSA card 100, as shown in FIG. 5, includes first printing 200 an exterior graphic on a first side of a flat sheet of a material such as paperboard or plastic so that the machine readable code 142 appears on the first side. These preprinted blanks may then be stored until a specific order for POSA cards is received 202. The activation code 144 is printed 204 on the second side of the activation card portion 140. The flat sheet is then die cut 206 to define the first wallet portion 110, the second wallet portion 130 and the activation card portion 140, as well as the openings therethrough. The blank is then folded and glued 208. As will be readily appreciated, other orderings of these steps may be employed without departing from the scope of the invention.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A point of sale activation unit, comprising:
(a) a first wallet portion having an exterior side and an opposite interior side, the first wallet portion defining a first opening therethrough, the first opening having a shape corresponding to a machine readable code, the first wallet portion including a security tab affixed thereto with at least two nicks, the security tab obscuring at least part of a second opening defined by the first wallet portion;
(b) a second wallet portion having an exterior side and an opposite interior side, the second wallet portion coupled to the first wallet portion; and
(c) an activation card portion having an exterior side, an opposite interior side and a width that is less than the second opening defined by the first wallet portion, the machine readable code printed on the exterior side and an activation code printed on the interior side, the activation card portion extending from the second wallet portion and coupled thereto with at least one nick,
wherein the first wallet portion, the second wallet portion and the activation card portion are all cut from a single flat sheet, the activation card portion folded against the interior side of the second wallet portion, the interior side of the first wallet portion folded against the interior side of the second wallet portion so as to define a space therebetween and so that the activation card portion is disposed in the space, wherein the first opening is positioned so that the machine readable code is exposed through the first opening, the first wallet portion being glued to the second wallet portion so as to prevent access to the activation code, the security tab configured to be opened by tearing at least one nick thereby allowing the activation card portion to be removed through the second opening so as to expose the activation code.

2. The point of sale activation unit of claim 1, wherein the flat sheet comprises material selected from a list consisting of: paperboard, plastic, and combinations thereof.

3. The point of sale activation unit of claim 1, wherein the machine readable code comprises a barcode.

4. The point of sale activation unit of claim 1, further comprising a graphic printed on the exterior side of at least one of the first wallet portion and the second wallet portion.

5. The point of sale activation unit of claim 1, wherein the first wallet portion, the second wallet portion and the activation card portion are die cut from the single flat sheet.

6. The point of sale activation unit of claim 1, wherein the first wallet portion defines a first hang tab opening passing therethrough and the second wallet portion defines a second hang tab opening passing therethrough and aligned with the first hang tab opening, thereby defining a passage receptive to a display peg so as to facilitate displaying the point of sale activation unit.

7. The point of sale activation unit of claim 1, wherein the glue used to secure the first wallet portion to the second wallet comprises a material that makes tampering with the point of sale activation unit evident.

8. The point of sale activation unit of claim 1, further comprising a transparent plastic film applied to the first wallet portion so as to cover the machine readable code.

* * * * *